United States Patent [19]
Kanbe et al.
[11] Patent Number: 4,579,882
[45] Date of Patent: Apr. 1, 1986

[54] SHIELDING MATERIAL OF ELECTROMAGNETIC WAVES

[75] Inventors: Tokuzo Kanbe, Abiko; Yaomi Kumagai, Sakura; Keiji Nemoto, Ushiku; Kei Urabe, Sakura, all of Japan

[73] Assignee: Director-General of the Agency of Industrial Science and Technology, Tokyo, Japan

[21] Appl. No.: 546,518

[22] Filed: Oct. 28, 1983

[30] Foreign Application Priority Data

Oct. 28, 1982 [JP] Japan ............................ 57-190264
Mar. 3, 1983 [JP] Japan ............................ 58-57702

[51] Int. Cl.⁴ ............................ C08K 3/08
[52] U.S. Cl. ............................ 523/137; 523/216; 523/217; 252/513; 252/514
[58] Field of Search ............ 252/513, 514; 523/216, 523/217, 137; 427/217, 304, 305; 106/308 B

[56] References Cited

U.S. PATENT DOCUMENTS

| | | | |
|---|---|---|---|
| 3,031,344 | 4/1962 | Sher et al. | 252/514 |
| 3,202,488 | 8/1965 | Ehrreich et al. | 252/514 |
| 3,476,530 | 11/1969 | Ehrreich et al. | 252/513 |
| 3,725,308 | 4/1973 | Ostolski | 252/513 |
| 3,968,056 | 7/1976 | Bolon et al. | 252/514 |
| 4,011,360 | 3/1977 | Walsh | 523/217 |
| 4,088,801 | 5/1978 | Bolon et al. | 252/514 |
| 4,098,945 | 7/1978 | Oehmke | 252/514 |
| 4,233,191 | 11/1980 | Reuter et al. | 252/514 |
| 4,496,475 | 1/1985 | Abrams | 252/514 |

*Primary Examiner*—Lewis T. Jacobs
*Attorney, Agent, or Firm*—Wyatt, Gerber Shoup, Scobey and Badie

[57] ABSTRACT

The shielding material of electromagnetic waves of the invention is formed of a polymeric material as the matrix and an inorganic powder, e.g. mica flakes, metallized on the surface of the particles with a metal, e.g. nickel, as the conductive dispersant in the matrix. The metallization of the inorganic powder is performed by chemical plating, preferably, after pretreatment with an organic compound having a functional group capable of capturing ions of a noble metal and then with a solution containing a noble metal, preferably, palladium. This pretreatment is effective to increase the firmness of bonding between the metallizing layer and the surface of the particles so that the shielding effect of the material is greatly improved.

23 Claims, No Drawings

SHIELDING MATERIAL OF ELECTROMAGNETIC WAVES

BACKGROUND OF THE INVENTION

The present invention relates to a novel shielding material of electromagnetic waves or, more particularly, to a shielding material of electromagnetic waves formed of a polymeric matrix and an electroconductive particulate dispersant dispersed therein.

One of the serious problems accompanying the recent development and prevalence of various kinds of electronic instruments is the electromagnetic noise caused by the interference of the electromagnetic or radio waves emitted from an instrument with others as a public nuisance. A method for preventing or reducing such a trouble is the use of a shielding material of radio waves and it is a very important and urgent problem to develop an efficient and inexpensive material for such a purpose.

Several types of radio wave shielding materials are known in the art including a material prepared by providing an electroconductive surface layer on a suitable substrate material by, for example, flame fusion of a metal or coating with an electroconductive coating composition, e.g. paint. These shielding materials are, however, not quite satisfactory from the practical standpoint due to the expensiveness and poor durability of the shielding effect. An alternative shielding material is formed of a polymeric material; i.e. plastic resins and rubbers, as a matrix and a conductive particulate or fibrous dispersant uniformly dispersed in the matrix. Metal fibers and metal powders are hitherto proposed as such a conductive dispersant. A problem in the shielding material of a polymeric matrix impregnated with such a metallic dispersant is the decreased moldability of the polymeric composition and the insufficient mechanical strengths of the shaped shielding material when the polymeric matrix material is impregnated with the metallic dispersant in an amount sufficient to ensure effective shielding effect of radio waves. Therefore, the fields of application of the shielding materials of such a type is largely limited.

SUMMARY OF THE INVENTION

It is therefore an object of the present invention to provide a novel and improved shielding material of electromagnetic waves freed from the above described problems in the prior art.

Another object of the invention is to provide a novel and improved ratio wave shielding material which is of the type formed of a polymeric material as the matrix impregnated with a conductive particulate material as the dispersant and has a greatly improved mechanical strengths notwithstanding the high loading with the conductive dispersant to give a sufficient effect of shielding.

A further object of the invention is to provide a novel method for the preparation of a conductive particulate material suitable as a conductive dispersant for impregnating a polymeric material to form a radio wave shielding material.

Thus, the shielding material of electromagnetic waves provided by the invention comprises a polymeric material as the matrix and a conductive particulate material dispersed uniformly in the polymeric matrix, the conductive particulate material being composed of particles of an inorganic material, preferably, a mica, coated on the surface with a metal film deposited by chemical plating or electroless plating.

A particularly useful conductive particulate material for the above purpose is prepared by a method comprising the steps of subjecting an inorganic powder to a surface treatment with a noble metal-uptake or -capturing agent, treating the powder with a solution containing ions of a noble metal and subjecting the powder to a chemical plating with a metal.

DETAILED DESCRIPTION OF THE PREFERRED EMBODIMENTS

As is described above, the conductive dispersant in the inventive shielding material is formed not of solid metal particles or fibers but formed of particles having a structure of a stable inorganic powder coated only on the surface with a metal to be provided with electroconductivity so that the material is chemically very stable and, even when the polymeric matrix is impregnated with such a conductive powder in a high loading, the mechanical strengths thereof are not decreased despite the high electroconductivity. In particular, a high reinforcing effect can be obtained when mica flakes coated with a metal are used as the conductive dispersant.

The inorganic powder used as the substrate of the conductive dispersant used in the inventive shielding material may be a similar one to those conventionally used as a reinforcing or non-reinforcing filler, extender or coloring agent in polymeric materials including rubbers and thermoplastic or thermosetting resins. Several of the examples suitable therefor are: muscovite mica, phlogopite mica, fluorine-containing synthetic micas and the like mica minerals and potassium titanate whiskers, wallastonite, asbestos, sepiolite and the like needle-formed minerals as well as silica powders, alumina powders, glass flakes, glass fibers, carbon flakes, carbon fibers, silicon fibers and the like, of which the flaky mica minerals are preferred in respect of the reinforcing effect. It is of course a requirement for the inorganic particulate material that the material is stable in the process of chemical plating since the conductive metal film on the particles is essentially formed by chemical plating in the invention. The forms of the particulate material is not particularly limitative including particles, plates, flakes, needles and fibers.

The method of chemical plating, by which the conductive dispersant used in the inventive shielding material is provided with a metallic coating, is in itself well known in the art of metal plating. The formulation of the chemical plating solution may be any one of the conventionally used ones. The metallic element, of which the conductive surface film is formed on the particles of the dispersant material, is not particularly limitative including, for example, nickel, cobalt, silver, gold, copper, palladium, platinum, rhodium, ruthenium-, iron and the like. The metallic surface film need not be formed of a single metal but may be formed of an alloy of two kinds or more of the metals such as the combinations of nickel and cobalt, nickel and tungsten, nickel and iron, cobalt and tungsten, cobalt and iron, nickel and copper and the like. When such a conductive surface film of an alloy is desired, the chemical plating solution should contain two or more of the metal salts corresponding to the metal constituents in the alloy.

In order to obtain very firm bonding between the metallic surface film and the surface of the substrate particles, it is important, as in the conventional plating procedures, that the powder must be completely degreased in advance followed by a pretreatment as mentioned below. The pretreatment is undertaken with an object to facilitate deposition of the metallic surface film on to the surface of the particles of the inorganic powder. The pretreatment is performed, according to the kind of the metallic element to form the conductive surface film on the particles, (1) by dipping the powder in an aqueous solution containing 1 to 30 g/liter of tin(II) chloride and 1 to 30 ml/liter of hydrochloric acid followed by dipping in an aqueous solution containing 0.1 to 1 g/liter of palladium chloride and 1 to 10 ml/liter of hydrochloric acid, (2) by dipping the powder in an aqueous solution containing 0.1 to 1 g/liter of palladium chloride and 1 to 30 ml/liter of hydrochloric acid or (3) by dipping the powder in an aqueous solution containing 0.2 to 3 g/liter of palladium chloride, 10 to 40 g/liter of tin(II) chloride and 100 to 200 ml/liter of hydrochloric acid followed by dipping in a diluted hydrochloric acid of 5 to 10% concentration.

The inorganic powder, after completion of the above mentioned pretreatment, is then subjected to the chemical plating or electroless plating by use of a chemical plating solution. The formulation of the chemical plating solution is well known in the art and contains a salt of the metal to form the metallic surface film, reducing agent, complexing agent, buffering agent, stabilizer and the like. The reducing agent suitable in such a plating solution is exemplified by sodium hypophosphite, sodium boron hydride, aminoborane, formalin and the like and the complexing agent and buffering agent are exemplified by formic acid, acetic acid, succinic acid, citric acid, tartaric acid, malic acid, glycine, ethylenediamine, EDTA, triethanolamine and the like.

A typical formulation of the chemical plating solution contains, for example, 10 to 200 g/liter of a salt of the metal, 0.3 to 50 g/liter of a hypophosphite and 5 to 300 g/liter of a pH buffering agent, preferably, with admixture of 5 to 200 g/liter of glycine as an auxiliary additive. Another typical formulation of the solution contains 10 to 200 g/liter of a salt of the metal, 10 to 100 g/liter of a salt of carboxylic acid, 10 to 60 g/liter of an alkali hydroxide, 5 to 50 g/liter of an alkali carbonate and 10 to 200 ml/liter of formalin. The metal salt may be typically a salt of copper or silver.

The treatment of the chemical plating is performed usually at a temperature of 20° to 95° C. and unformity of the metallic surface film on the particles may be ensured, preferably, by agitating the suspension of the inorganic powder in the plating solution, for example, by bubbling air into the suspension. The treatment of chemical plating should be continued until the amount of metallization of the inorganic powder has reached 10% or larger based on the weight of the inorganic powder.

The above described method of chemical plating of a metal on an inorganic powder is sufficiently versatile to give quite satisfactory results in many cases of the combinations of the inorganic powder and the metal to form the metallic surface film on the particles and capable of giving a quite satisfactory shielding effect of radio waves without decreasing the mechanical properties of the polymeric material impregnated therewith. There are, however, several cases where the above described process of chemical plating cannot give good results of metal plating depending on the nature of the surface of the inorganic powder.

Accordingly, the inventors have undertaken investigations to develop a method of chemical plating on an inorganic powder which is very versatile in providing a metallic surface film firmly bonded to the surface of the particles beginning with the studies on the relationship between the nature of the surface of the inorganic powders and easiness of forming a firmly bonded metallic surface film on the particles in the chemical plating resulting in the discovery of the effectiveness of a specific pretreatment for the treatment with a noble metal-containing solution.

The method including the above mentioned pretreatment for the preparation of a metal-coated inorganic powder comprises the steps of (a) subjecting the inorganic powder to a surface treatment with a noble metal-uptake or -capturing agent, (b) treating the inorganic powder with a solution containing ions of a noble metal and (c) subjecting the powder to a chemical plating with a metal.

The above described novel method for chemical plating of an inorganic powder is applicable to any inorganic powders named before.

The noble metal-uptake or -capturing agent used in the above mentioned step (a) serves to enhance the absorptivity of the surface to the noble metal in the step (b). The noble metal-uptake agent used in this method is an organic compound having, in a molecule, at least one functional group having affinity to the surface of the inorganic powder and at least one functional group capable of capturing the noble metal or having affinity thereto. The functional group having affinity to the surface of the inorganic powder is exemplified, for example, by carboxyl group, ester group, amino group, hydroxy group, nitrile group, halogen atoms, e.g. chlorine and bromine, isocyanate group, glycidyloxy group and alkoxy and alkenyl groups, e.g. vinyl group, bonded to a silicon atom or titanium atom and the functional groups capable of capturing a noble metal are exemplified by the above named groups and alkenyl groups such as vinyl.

The functional organic compound as the noble metal-uptake agent should accordingly have at least two functional groups above named which may be either of the same kind or of different kinds from each other. The functional groups may be bonded to the molecule of the organic compound either as the terminal groups or as the pendant groups at the side chains. The organic compound having the functional groups may be low molecular, oligomeric or high polymeric with no particular limitations.

It should be noted that the nature of the linkage formed between the functional organic compound and the surface of the inorganic powder, which may be chemical or physical, has a considerable influence on the strength of the bonding to be formed therebetween. In this regard, chemical bonding is preferred to physical due to the larger strength of bonding between the functional organic compound and the surface of the inorganic powder resulting in the increased firmness of the adhesion of the metallic surface film to the powder surface. For example, a silane coupling agent or a titanium coupling agent having an alkoxy group can be chemically bonded to the surface of the inorganic powder. On the other hand, a functional organic compound soluble in water and alcohol is used in the form of an alcoholic solution in which the inorganic powder is dipped and then dried so that the functional compound is deposited on the surface of the powder particles by physical adsorption which is not strong enough to prevent intrusion of water into the interface to split off the organic compound from the surface. It is therefore preferable that an adequate hydrophobicity is imparted to the carbon-to-carbon linkage or methylene linkage in the molecule or the organic compound has a relatively large molecular weight to prevent splitting off of the compound by the intrusion of water into the interstice. Assuming that the functional organic compound is an aliphatic compound, for example, it is preferable that the compound has at least three methylene groups directly linked together to each other.

Particular examples of the noble metal-uptake agent which is an organic compound having at least two functional groups include, for example, 3-chloropropyl trimethoxysilane, 3-aminopropyl triethoxysilane, vinyl triethoxysilane, 3-methacryloxypropyl triethoxysilane, N-2-aminoethyl-3-aminopropyl trimethoxysilane, N-2-aminoethyl-3-aminopropyl methyl dimethoxysilane and the like organosilane compounds; hexamethylene diamine, trimethylene diamine, diaminododecane and the like amino compounds, maleic acid, sebacic acid, adipic acid and the like dibasic acids; triethylene glycol, polyethylene glycol, diglycol amine and the like glycol compounds; malononitrile, polyacrylonitrile and the like nitrile compounds and isopropyl tri(dioctyl pyrophosphate) titanate, titanium di(dioctyl pyrophosphate) oxyacetate, isopropyl (N-ethylamino ethylamino) titanate, isopropyl triiostearoyl titanate and the like titanate compounds as well as maleic acid-modified polybutadiene, polybutadiene having carboxyl terminal groups, polybutadiene having glycolic hydroxy terminal groups, copolymers of acrylonitrile and butadiene and the like homo- or copolymers of butadiene and graft polymers thereof; linoleic acid, linolenic acid and the like unsaturated fatty acids; and chlorinated paraffins, chlorinated polyethylenes and the like chlorinated compounds. The noble metal-uptake agent should be selected from the above named compounds by a suitable test as shown in the examples given later.

The pretreatment of the inorganic powder with the above named functional organic compound is performed in a wet process by bringing the powder into contact, for example, by dipping, with a solution of the compound in a suitable organic solvent such as ethyl alcohol, acetone, toluene, dimethyl formamide, dimethyl sulfoxide and dioxane followed by the evaporation of the solvent to dryness or, alternatively, in a dry process in which the inorganic powder and the organic compound are directly blended together by use of a suitable blending machine such as a Henschel mixer until a uniform coating of the powder particles with the organic compound is obtained. In performing the above mentioned wet process, the functional organic compound contained in the solution should preferably be in such a concentration depending on the surface area of the powder that the surface of the powder particles is provided with a monomolecular coating layer of the compound which is calculated from the maximum specific coating area of the compound per se given in $m^2/g$, the specific surface area of the inorganic powder in $m^2/g$ and the amount of the inorganic powder in g. When the inorganic powder has a specific surface area of about 5 $m^2/g$, the concentration of the organic compound in the treatment solution is preferably in the range from 0.5 to 2% by weight. The temperature for evaporating the organic solvent from the inorganic powder wet with the organic solution may be a temperature up to the boiling point of the solvent. When the functional organic compound is an organosilane compound which should pertain to a dehydration condensation reaction between the functional groups of the compound or between a functional group of the compound and the surface of the inorganic powder, in particular, it is preferable that the inorganic powder treated with the solution and dried by evaporating the solvent is further heated for 1 to 3 hours at 80° to 150° C. with an object to promote the reaction.

The inorganic powder having been treated in the above described manner has a surface on which the noble metal-capturing functional groups are exposed to impart the surface with modified or improved nature toward capturing the noble metal ions so that, when the powder is brought into contact with a noble metal-containing solution in the next step, the noble metal ions are readily captured by the functional groups to form a firmly bonded noble metal layer. This noble metal layer on the surface exhibits a catalytic effect in the subsequent step of chemical plating to deposit the plating metal on the surface.

The noble metal suitable in this noble metal treatment may be palladium, platinum, gold or the like although palladium is preferred. The solution containing the noble metal ions can be prepared by a conventional method in which, for example, a water-soluble salt, e.g. halide, of the noble metal is dissolved in an aqueous medium containing a solubilizing agent such as hydrochloric acid. The amount of the noble metal deposited on the inorganic powder is preferably in the range from $3\times10^{-6}$ to $3\times10^{-1}$ part by weight or, more preferably, from $3\times10^{-4}$ to $3\times10^{-2}$ part by weight per 100 parts by weight of the inorganic powder. The inorganic powder having been treated with the noble metal-containing solution is washed with water before it is subjected to the subsequent step of chemical plating. Two typical formulations of the chemical plating solution and the method for performing chemical plating are already described. A preferable carboxylic acid salt in the second formulation is potassium sodium tartrate.

When the inorganic powder has been subjected to the noble metal treatment including the specific pretreatment with a functional organic compound, the susceptibility of the powder surface to the deposition of the plating metal is greatly improved so that very firm deposition of the plating metal can readily be obtained. Therefore, the versatility in respect of the formulation of the chemical plating solution is greatly enlarged and not only a freshly prepared chemical plating solution according to the above described formulation but also several spent solutions obtained in conventional processes of chemical plating can be used for the purpose in this case. Furthermore, waste etching solutions used in an etching process of nickel or copper contain the respective metal ions and can be used as the chemical plating solution in the invention when the waste solution is diluted, for example, up to 100 times and admixed with a complexing agent and a reducing agent. The utilizability of such hitherto futile solutions as the chemical plating solution in the invention is advantageous by greatly decreasing the cost for the chemical plating since the efficiency of the metal deposition from such a spent or waste solution on to the inorganic powder is about the same as from a freshly prepared chemical plating solution. In addition, the metal ions contained in the waste solution can be deposited on to the surface of the inorganic powder in a very high efficiency and with completeness due to the large specific surface area of the inorganic powder so that the diversion of such a spent or waste solution into the chemical plating solution in the invention provides a promising way for the metal value recovery and the disposal of industrial waste materials containing metal ions.

The metallized inorganic powder prepared in the above described manner exhibits metallic luster and is electrically conductive. A useful application of such a metallized inorganic powder is of course as a conductive dispersant in the radio wave shielding material dispersed in a polymeric matrix. Needless to say, the metallized inorganic powder can be utilized in any applications where metallic luster and electroconductivity are desired for a powdery material, for example, as a reinforcing or non-reinforcing filler, coloring agent, extender and the like in synthetic resins and rubbers as well as coating compositions.

The surface properties of the metallized inorganic powder prepared according to the above described method can be further modified by a suitable post-treatment such as oxidation and sulfurization treatment on the surface. The oxidation treatment can be performed by heating the metallized inorganic powder at 200° to 400° C. in air or in an oxidizing atmosphere or, alternatively, by treating the metallized inorganic powder in an aqueous solution containing an oxidizing agent. The sulfurization treatment can be performed by use of hydrogen sulfide or other suitable sulfur compounds. The oxidation treatment has an effect of modifying the metallic luster of the powder with some coloring according to the degree of oxidation so that certain decorative effects can be expected for the metallized inorganic powder with subsequent oxidation treatment.

When a radio wave shielding material of the present invention is prepared with the metallized inorganic powder as the conductive dispersant, a polymeric material is blended with 10 to 70% by weight of the powder into a uniform composition which is shaped into a desired form.

The polymeric material used as the matrix of the inventive shielding material may be a synthetic resin or a rubber according to need. The synthetic resins include both of the thermoplastic and thermosetting resins exemplified by polyethylenes, polypropylenes, polystyrenes, polyvinyl chloride resins, polymethyl methacrylates, polyethylene terephthalates, polybutylene terephthalates, polycarbonate resins, polyacetal resins, polyurethane resins, nylon 6, copolymers of ethylene and vinyl acetate, copolymers of ethylene and acrylic acid, ABS resins, epoxy resins, unsaturated polyester resins, phenolic resins and the like. Natural rubber and any synthetic rubbers can be used as the matrix polymer when a shielding material having rubbery elasticity is desired.

The radio wave shielding material of the invention can be in any desired form including plates, tubes, boxes and the like according to need. The shaping method of the polymeric composition loaded with the metallized inorganic powder may be conventional according to the nature of the polymeric material, forms of the desired shielding material and other factors including vacuum forming, extrusion molding, injection molding, calendering, compression molding and the like. It is of course that the radio wave shielding effect can be obtained when a suitable substrate is coated with a coating composition or paint containing the metallized inorganic powder dispersed in an aqueous emulsion of the polymer or in an organic solution containing the polymer as the vehicle.

The shielding material of the present invention is very effective in shielding electromagnetic or radio waves along with the excellent mechanical properties so that it is very useful for the shielding purpose in a variety of electronic instruments including communication instruments, medical instruments, metering instruments, information-processing instruments and the like.

In the following, examples are given to illustrate the preparation of the metallized inorganic powders and the shielding materials using the metallized inorganic powder as the conductive dispersant in a polymeric matrix as well as the effectiveness of the inventive shielding material when used as a radio wave shielding material. In the following examples, the content of the plating metal in the metallized inorganic powder is expressed by % metallization which is a value calculated by the following equation:

% metallization = (weight of deposited metal)/[(weight of inorganic powder) + (weight of deposited metal)] × 100.

PREPARATION 1

A flaky mica powder having an average particle size to pass a screen of 60 mesh opening by the Tyler standard was subjected to a pretreatment by dipping in an aqueous solution of palladium chloride acidified with hydrochloric acid. The thus pretreated mica powder was introduced into a chemical plating solution at a pH of 4 to 6 containing 30 g/liter of nickel sulfate, 10 g/liter of sodium hypophosphite and 10 g/liter of sodium citrate and agitated for 10 to 30 minutes at a temperature of 60° to 90° C. with air bubbling followed by drying.

The particles of the thus obtained mica powder had a surface film of nickel and exhibited good electroconductivity as indicated by a test with probes of a circuit tester contacted therewith.

In a similar manner to the above, several kinds of metallized inorganic powders were prepared with different combinations of the inorganic powder and the metal salt in the plating solution to deposit a metallic surface film on the powder. The combinations were as shown below.

Flaky mica powder: nickel; copper; an alloy of nickel and copper; an alloy of nickel and tungsten; and an alloy of nickel and boron
Whisker of potassium titanate: nickel; and copper
Glass flakes and glass fibers: nickel; and copper
Carbon fibers: nickel; copper; an alloy of nickel and tungsten; and an alloy of nickel and boron
Silicon fibers: nickel; and copper All of these metallized inorganic powders exhibited good electroconductivity.

PREPARATION 2

A flaky powder of a phlogopite mica having an average particle size to pass a screen of 60 mesh opening was used as the inorganic base powder and 100 g of the mica powder were dipped in 120 ml of an organic solution containing 0.5 to 1.0% by weight of a functional organic compound having various kinds of functional groups as indicated in Table 2 below at room temperature for 2 hours and then dried by the evaporation of the solvent at 110° C. for 2 hours. Ethyl alcohol, toluene, acetone, dimethyl formamide and others were used as the solvent according to the nature of the organic compound.

A noble metal treatment of the thus pretreated inorganic powder was performed by dipping 20 g of the mica powder in 50 ml of an aqueous solution containing palladium chloride in a concentration of $5\times10^{-6}$ g/liter and acidified with hydrochloric acid for 30 minutes at room temperature followed by filtration and washing twice each time with 20 ml of deionized water.

The above obtained mica powder was introduced into either one of the spent solutions No. 1 to No. 3 from the process of nickel plating and agitated for 20 to 40 minutes at a temperature of 75° to 95° C. The composition and the value of pH of each of these waste solutions are shown in Table 1 below.

TABLE 1

| Ingredients & pH | No. 1 | No. 2 | No. 3 |
|---|---|---|---|
| Nickel chloride, g/liter | 10-50 | — | — |
| Nickel sulfate, g/liter | | 10-50 | 10-50 |
| Sodium hypophosphite, g/liter | 10-100 | 10-100 | 10-100 |
| Acetic acid, g/liter | — | 5-20 | 5-20 |
| Citric acid, g/liter | — | 5-20 | — |
| Succinic acid, g/liter | 5-20 | — | 5-20 |
| Malic acid, g/liter | — | — | 5-20 |
| pH | 4-6 | 4-6 | 4.5-5.5 |

Thereafter, the suspension of the mica powder in the spent solution was filtered with suction followed by drying into a powdery form. All of the thus obtained powdery materials had metallic luster and indicated electroconductivity in the test with a circuit tester as in Preparation 1 above.

Each of the powdery materials obtained in the above was analyzed for the content of nickel deposited on the mica powder to give the results shown in Table 2 below as the content of nickel in % for each of the functional organic compounds together with the amount thereof adsorbed on the mica powder. The content of nickel in % by weight given in Table 2 is based on the dried mica powder before the treatment. It is of course that the values of the content of nickel in % shown in Table 2 are subject to variation depending on the concentration of the nickel ions contained in the spent plating solution and the amount of the reducing agent added to the solution.

It should be noted that the metallic luster of the thus prepared metallized mica powder was better when the functional organic group in the organic compound for the pretreatment was amino or nitrile group and a functional organic compound having a higher molecular weight gave lower metallic luster of the metallized mica powder. Among the polymeric functional organic compounds, polyacrylonitrile gave the best metallic luster. In connection with the electroconductivity and the metallic luster of the metallized mica powders, the spent nickel plating solutions No. 1 to No. 3 gave substantially the same results. The values of the content of nickel in % by weight on the metallized mica powders shown in Table 2 were obtained with a spent plating solution containing about 5 g/liter of nickel ions. The metallic luster shown in Table 2 by the symbol A was excellent while the luster shown by B was somewhat inferior.

TABLE 2

| Exp. No. | Noble metal-uptake agent: Compound | Noble metal-uptake agent: % adsorption on mica | Nickel content, % | Metallic luster |
|---|---|---|---|---|
| 1 | 3-Aminopropyl triethoxysilane | 1.0 | 44.8 | A |
| 2 | N—(2-aminoethyl)-3-aminopropyl trimethoxysilane | 1.0 | 45.5 | A |
| 3 | 3-Methacryloxypropyl trimethoxysilane | 1.0 | 43.2 | A |
| 4 | 3-Chloropropyl trimethoxysilane | 1.0 | 47.3 | A |
| 5 | Trimethylene diamine | 1.0 | 46.7 | A |
| 6 | Hexamethylene diamine | 1.0 | 54.0 | A |
| 7 | Diaminododecane | 1.0 | 45.4 | A |
| 8 | Diglycolamine | 1.0 | 44.3 | A |
| 9 | Triethylene glycol | 1.0 | 47.3 | B |
| 10 | Maleic acid | 1.0 | 45.8 | B |
| 11 | Sebacic acid | 1.0 | 36.8 | B |
| 12 | Carboxyl-terminated polybutadiene | 0.5 | 52.7 | B |
| 13 | Maleic-modified polybutadiene | 0.5 | 50.2 | B |
| 14 | Malononitrile | 1.0 | 29.4 | B |
| 15 | Isopropyl (dioctyl pyrophosphate) titanate | 1.0 | 42.3 | A |
| 16 | Titanium di(dioctyl pyrophosphate) oxyacetate | 1.0 | 40.5 | A |
| 17 | Isopropyl (N—ethylamino ethylamino) titanate | 1.0 | 43.3 | A |
| 18 | Isopropyl tri(isostearoyl) titanate | 1.0 | 41.4 | B |
| 19 | Vinyl triethoxysilane | 1.0 | 45.3 | A |
| 20 | N—(2-aminoethyl)-3-aminopropyl methyl dimethoxysilane | 1.0 | 46.5 | A |
| 21 | Chlorinated paraffin (40% chlorine) | 1.0 | 44.7 | A |
| 22 | Chlorinated paraffin (70% chlorine) | 0.5 | 42.0 | A |
| 23 | Linoleic acid | 1.0 | 45.6 | B |
| 24 | Linolenic acid | 1.0 | 44.3 | B |
| 25 | Polymethyl methacrylate | 0.5 | 49.2 | B |
| 26 | Polyacrylic acid | 0.5 | 47.0 | A |
| 27 | Polyacrylonitrile | 0.5 | 51.0 | A |
| 28 | Copolymer of acrylonitrile (17%) & butadiene | 0.5 | 48.1 | A |
| 29 | Polybutadiene | 0.5 | 50.2 | B |
| 30 | Polycyanoacrylate | 1.0 | 48.7 | A |
| 31 | Phenolic resin | 2.0 | 50.8 | A |
| 32 | Resorcinol resin | 2.0 | 50.8 | B |

PREPARATION 3

A chemical plating solution was prepared from a spent etching solution having been used in an etching process for copper and containing copper(II) chloride in a concentration of 100 g/liter as copper and acidic with hydrochloric acid and 200 ml of this spent solution were admixed with 135 g of potassium sodium tartrate and, after adjustment of the pH to 13 by adding an aqueous solution of sodium hydroxide, 105 ml of a 37% formalin as a reducing agent. On the other hand, the same phlogopite mica powder as used in Preparation 2 was treated in a similar manner with an ethyl alcohol solution of 3-aminopropyl triethoxysilane to have 2% by weight of the silane adsorbed on the mica powder after drying and 18 g of the thus pretreated mica powder were dipped in 40 ml of an aqueous solution of palladium chloride in a concentration of $5\times10^{-5}$ g/liter as $PdCl_2$ acidified with hydrochloric acid and kept there for 60 minutes at room temperature followed by filtration to remove excess of the solution and introduction into the above prepared chemical plating solution.

After 60 minutes of agitation in the plating solution at about 35° C., the mica powder was separated from the solution by filtration and neutralized with a 0.2N sulfuric acid followed by thorough washing with water to neutral and then washing with ethyl alcohol. Vacuum drying of the thus treated mica powder gave a copper-coated metallized powder having a metallic luster of copper and good electroconductivity as indicated by the test in the same manner as in Preparation 1. The value of the % metallization was as large as 53.5% or 18 g of the mica powder were coated with 20.7 g of copper deposited on the surface.

PREPARATION 4

The functional organic compound used as the pretreatment agent in this case was a phenolic resin and the same mica powder as used in Preparation 2 was dipped in an ethyl alcohol solution containing a phenolic resin (admixed with 7% by weight of a curing agent) in an amount of 2% by weight based on the mica powder and further with an acidic solution of hydrochloric acid containing palladium chloride in an amount of 0.01% by weight based on the mica powder. After evaporation of the solvent to dryness, the mica powder was heated at 120° C. for 3 hours to effect curing of the phenolic resin on the mica powder.

The thus obtained palladium-treated mica powder was introduced into the same chemical plating solution as used in Preparation 3 above kept at 35° C. to effect metallization with copper. The surface of the mica particles was found to be completely coated with copper to give a metallic luster. This metallized mica powder exhibited good electroconductivity in the test similar to Preparation 1 and the value of the % metallization with copper was 54.0% or 20 g of the mica powder were coated with 23.5 g of copper.

EXAMPLE 1

The metallized phlogopite mica powder prepared in Preparation 1 was uniformly blended as a dispersant with a polypropylene resin in a varied proportion or % volume fraction in a Brabender plastomill and shaped in a hot press into a sheet of 2 mm thickness. For comparison, similar polypropylene sheets were prepared with the same mica powder before metallization and several particulate or fibrous materials having electroconductivity without metallization. These sheets were subjected to the measurements of the surface resistivity and volume resistivity. The measurement of the volume resistivity was performed in the directions of the thickness of the sheet and in the direction perpendicular to the direction of thickness since all of the test pieces more or less indicated anisotropy in the electric conductivity. The results are shown in Table 3.

TABLE 3

| Test sheet No. | | 1 | 2 | 3 | 4[1] | 5[2] | 6 | 7 | 8 | 9 | 10 | 11 |
|---|---|---|---|---|---|---|---|---|---|---|---|---|
| Dispersant | | Non-metallized mica | Metallized mica | Metallized mica | Metallized mica | Metallized mica | Metallized mica | Metallized mica | Acetylene black | Graphite powder | Aluminum fiber | Aluminum flake |
| Volume fraction of dispersant, % | | 15.0 | 14.6 | 14.3 | 14.2 | 11.9 | 28.6 | 27.1 | 16 | 21 | 19.9 | 19.9 |
| Volume fraction of nickel coating layer, % | | 0 | 4.8 | 4.8 | 5.4 | 7.3 | 4.3 | 9.1 | — | — | — | — |
| Specific gravity | | 1.20 | 1.43 | 1.53 | 1.57 | 1.69 | 1.78 | 2.13 | 1.02 | 1.20 | 1.26 | 1.26 |
| Surface resistivity, ohm | | $>10^6$ | $8.4 \times 10$ | 8.0 | $1.0 \times 10$ | $>10^6$ | $1.3 \times 10$ | 2.1 | $2.4 \times 10$ | $2.3 \times 10^3$ | $4.5 \times 10^{-1}$ | $2.5 \times 10$ |
| Volume resistivity, ohm · cm, in the direction | parallel to thickness | $>10^6$ | $3.2 \times 10^2$ | $5.8 \times 10$ | $6.9 \times 10$ | $>10^6$ | $8.7 \times 10$ | 9.7 | $2.8 \times 10^2$ | $2.3 \times 10^4$ | $3.1 \times 10$ | $1.4 \times 10^2$ |
| | perpendicular to thickness | $>10^6$ | $1.0 \times 10$ | 2.8 | 1.9 | $>10^6$ | 3.6 | $5.8 \times 10^{-1}$ | 7.9 | $1.1 \times 10^3$ | $2.9 \times 10^{-1}$ | 2.2 |

[1]The metallized mica powder was treated with a silane coupling agent.
[2]The metallized mica powder was heated at 400° C. for 2 hours in air.

Each of the test sheets Nos. 1 to 5 shown in Table 3 was prepared with the mica powder in such an amount that the volume fraction of the mica excepting the volume of the metallizing nickel layer with an assumed specific gravity of 7.95 was about 12 to 15% while the sheets Nos. 6 and 7 were prepared to give a volume fraction of mica of about 30%. It is understood that the resistivity of the test sheets decreases exponentially as the thickness of the metallizing nickel layer increases. As was expected, an anisotropy was found in the volume resistivity depending on the direction of measurement when the test sheet was prepared by compression molding with impregnation of, especially, a flaky or fibrous dispersant. The metallized mica powder used in the preparation of the test sheet No. 5 was heated prior to incorporation into the polypropylene resin to effect surface oxidation. In this case, slight coloring of the sheet was noted due to the formation of the nickel oxide film on the mica surface while the resistivity was increased greatly. This great increase in the resistivity is, however, not so detrimental in respect of the transmission loss of electromagnetic waves as is shown in Table 4 below when the sheet is used as a shielding material to give a transmisson loss of 10.5 dB. The test sheet No. 4 was prepared with the metallized mica powder which was treated with 3-aminopropyl triethoxysilane as a silane coupling agent before incorporation into the resin with an object to improve the adhesion of the mica surface to the resin so that the mica powder contained 0.5% by weight of the silane sticking to the surface. As is shown in Table 4, the silane treatment of the metallized mica powder had an effect of slightly increasing the resistivity of the test sheet in comparison with the test sheet No. 3 along with the considerable decrease in the transmission loss of electromagnetic waves as is shown in Table 4.

When a hydrophilic polymer is used as the polymeric matrix, the surface treatment of the dispersant can usually be omitted without decreasing the electroconductivity of the sheet. Since the phlogopite mica has a specific gravity of only 2.80 to 2.90 and the metallization of the mica powder on the surface has an effect of imparting a sufficient electroconductivity to a polymeric composition impregnated therewith, a great advantage is obtained with the inventive polymeric material in comparison with a conventional shielding material filled with metallic flakes of nickel due to the remarkably decreased weight of the shielding material exhibiting the same shielding effect.

EXAMPLE 2

The test sheets shown in Table 4 were subjected to the measurements of the transmissivity and reflectivity of electromagnetic waves in the microwave frequency range of 4 GHz. The measurement was performed by use of a waveguide of rectangular cross section for 4 GHz band (model WRJ-4) into which the test sheet cut in a rectangular form of 58.1 mm×29.1 mm to fit the inner walls of the waveguide tube was inserted and the transmissivity was determined by calculating the ratio of the indications read on a wattmeter after and before insertion of the test sheet into the waveguide while the output of the microwave generator was kept constant. The transmission loss expressed in dB is a value obtained by the multiplication by 10 of the common logarithm of the reciprocal of the transmissivity.

Since the maximum power received by the wattmeter was 1.5 mW in the apparatus used in the above measurements and the minimum value of the power readable on the wattmeter was 0.1 μW, the minimum transmissivity measurable in this metering system was 0.007% corresponding to a maximum transmission loss of about 40 dB.

The reflectivity was obtained by the measurement of the ratio S of the maximum and minimum of the standing waves formed by the interference of the incident waves and reflecting waves (voltage standing-wave ratio) by use of the following relationship between the voltage standing-wave ratio S and the power reflectivity $\gamma$:

$$\gamma = \left(\frac{S-1}{S+1}\right)^2.$$

It should be noted, however, that the accuracy of the measurement is somewhat decreased when measurement is performed with a test sheet having a high electroconductivity as being influenced by the performance of the detector of the standing waves with a large value of S. Therefore, the value of S was calculated in this measurement, in order to avoid this problem, by the measurement of the distance $\Delta l$ between the two points where the power of the standing waves is twice (the voltage was $\sqrt{2}$ times) at both sides of the minimum point $l_{min}$ according to the following equation:

$$S = \sqrt{1 + \frac{1}{\sin^2 \frac{\pi \Delta l}{\lambda_g}}}$$

in which $\lambda_g$ is the guide wavelength which is 9.81 cm at a frequency of 4.000 GHz.

The results obtained in the above described measurements are shown in Table 4, in which the Nos. of the test sheets correspond to those given in Table 3.

TABLE 4

| Test sheet No.* | Transmission loss, dB | Transmissivity, % | Reflectivity, % | Absorptivity, % |
|---|---|---|---|---|
| 1 | 0.24 | 94.7 | 4.8 | 0.5 |

TABLE 4-continued

| Test sheet No.* | Transmission loss, dB | Transmissivity, % | Reflectivity, % | Absorptivity, % |
|---|---|---|---|---|
| 2 | 17.7 | 1.7 | 86.3 | 12.0 |
| 3 | 30.9 | 0.1 | 89.8 | 10.1 |
| 4 | 22.1 | 0.6 | 94.2 | 5.2 |
| 5 | 10.5 | 8.8 | 87.7 | 3.5 |
| 6 | 22.5 | 0.6 | 85.2 | 14.2 |
| 7 | 37 | 0.0 | 93.7 | 6.3 |
| 8 | 17.5 | 1.7 | 85.0 | 13.3 |
| 9 | 12.6 | 5.6 | 83.2 | 11.2 |
| 10 | 28.7 | 0.1 | 96.9 | 3.0 |
| 11 | 22.1 | 0.6 | 94.2 | 5.2 |

*See Table 3.

While transmission loss of a sheet of the polypropylene resin as the matrix was 0.10 dB and the nonmetallized mica powder used in the test sheet No. 1 was almost ineffective in increasing the transmission loss, a very large transmission loss of 30 dB or larger could be obtained in the test sheets Nos. 3 and 7. The weight proportion of the metallic nickel in the metallized mica powder used in these test sheets was about 50%. As is shown by the data for the test sheets Nos. 5 and 4, the surface oxidation treatment of nickel film and the treatment with the silane coupling agent had an effect of decreasing the shielding power of the sheets. Comparison of the test sheets Nos. 10 and 11 with the test sheet No. 3 indicates that, while the volume fractions of the aluminum fibers and aluminum flakes in Nos. 10 and 11 were each 19.9% to be somewhat larger than the value 19.1% in No. 3 loaded with the metallized mica, the shielding power of the test sheet No. 3 was better than that of the sheets Nos. 10 and 11 loaded with the dispersant of metallic aluminum.

EXAMPLE 3

Three test sheets prepared in the same formulations as the test sheets Nos. 3, 7 and 11 shown in Table 3 as well as an aluminum plate were used as the radio wave shielding material and the shielding effect of them was measured in an electromagnetically shielded room by use of a spark plug of high voltage discharge (25 kV, 200 mA) as the source of noise generation in a frequency range up to 1 GHz.

The received signals were analyzed in a spectrum analyzer with the distance between a half-wavelength dipole antenna and the test material kept constant at 500 mm. The antenna was tuned at 50 MHz and 220 MHz for the ranges of the frequency analysis of 0 to 200 MHz and 0 to 1 GHz, respectively. The test sheet was attached to the 113 mm×113 mm opening in the front wall of a copper-made box having dimensions of 500 mm×500 mm×500 mm.

Table 5 below shows the results of the determination of the degree of attenuation in dB. The Nos. of the test sheets correspond to those given in Table 3 prepared with the same formulation, respectively. The average thickness of the sheets was 1.16 mm.

TABLE 5

| Test Sheet | | Degree of attenuation, dB | | | |
|---|---|---|---|---|---|
| No. | Thickness, mm | 30 MHz | 120 MHz | 350 MHz | 750 MHz |
| 3 | 1.15 | 10 | 21 | 18 | 25 |
| 7 | 1.15 | 20 | 20 | 24 | 38 |
| 11 | 1.25 | 0 | 0.2 | 0 | 0 |
| Aluminum | 1.00 | 35 | 30 | 33 | 30 |

TABLE 5-continued

| Test Sheet No. | Thickness, mm | Degree of attenuation, dB 30 MHz | 120 MHz | 350 MHz | 750 MHz |
|---|---|---|---|---|---|
| plate | | | | | |

The attenuation characteristic of the test sheets filled with the metallized mica flakes was unique in comparison with that of the metallic aluminum plate. Table 5 shows the degrees of attenuation at the typical peaks of the attenuation characteristics. The test sheets Nos. 3 and 7 exhibited considerably good shielding effect although the weight proportion of the metallic nickel in the metallized mica powder used therein was about 50%.

EXAMPLE 4

A D.C. motor in an iron-made housing was rotated in an electromagnetically shielded room at 3 volts with dry batteries to generate noise waves at the brushes. The electromagnetic waves of the noise leaked through the test sheet covering the opening of 155 mm×60 mm in a wall of the shielded room was received by a half-wavelength dipole antenna placed 150 mm apart from the test sheet to be determined by the spectrum analyzer in the same manner as in Example 3. The results of the measurement are shown by the degrees of attenuation in dB in Table 6. The test sheet No. 3 was the same one as used in the preceding example.

TABLE 6

| Test sheet (thickness, mm) | Degree of attenuation, dB 10 MHz | 100 MHz | 370 MHz | 620 MHz | 900 MHz |
|---|---|---|---|---|---|
| No. 3 (1.16) | 20 | 17 | 23 | 20 | 20 |
| Aluminum plate (1.00) | 20 | 25 | 35 | 30 | 37 |

The degree of attenuation with the aluminum plate was stable at about 35 dB in the whole frequency range up to 1 GHz and the attenuation behavior with the test sheet No. 3 filled with the metallized mica flakes was about the same as in Example 3. The data shown in Table 6 are the degrees of attenuation at the peaks. Although the attenuation was only about 5 dB at certain frequencies, the degree of attenuation was about 15 dB on an average when the frequency was high, for example, at 500 MHz.

EXAMPLE 5

The test sheets Nos. 1, 3, 4 and 10 prepared in Example 1 and having a thickness of about 1.2 mm were subjected to the tensile tests with dumbbell-shaped test pieces taken by cutting therefrom. The velocity of pulling was 5 mm/minute and the data obtained in 7 measurements were averaged. The thus obtained results of the tensile strength and the tensile modulus are shown in Table 7.

TABLE 7

| Test sheet No. | 1 | 3 | 4 | 10 |
|---|---|---|---|---|
| Tensile strength, kg/cm$^2$ | 248 | 258 | 283 | 161 |
| Tensile modulus, kg/mm$^2$ | 720 | 340 | 430 | 140 |

The data in Table 7 indicates that the metallization of the mica flakes with nickel has little influences on the tensile strength of the test sheet. The treatment of the metallized mica flakes with a silane coupling agent has an effect of increasing the tensile strength of the sheet by about 1.1 times as is shown by the comparison of the sheets No. 3 and No. 4 although this treatment is undesirable due to the decrease in the shielding effect. It should be noted that the test sheets Nos. 3 and 4 filled with the metallized mica flakes have higher tensile strength and tensile modulus than the sheet No. 10 prepared with aluminum fibers as the dispersant while the volume fractions of the disperant in these sheets are about the same.

EXAMPLE 6

A polymeric composition was prepared by admixing a polypropylene resin with a nickel-metallized mica powder of 53% metallization in an amount of 55% by weight of 230° C. for 6 minutes in a Brabender plastomill. The volume fraction of the dispersant in this polymeric composition was 25%. This polymeric composition was shaped into a sheet of 2 mm thickness by compression molding at 220° C. for 5 minutes. The volume resistivity of this sheet was $5.1\times10^{-1}$ ohm.cm.

The shielding characteristics of this sheet for electric and magnetic fields are shown in Table 8 at various frequencies up to 4 GHz.

TABLE 8

| Frequency, MHz | Degree of attenuation, dB Shielding of electric field | Shielding of magnetic field |
|---|---|---|
| 100 | 40 | 10 |
| 200 | 45 | 13 |
| 300 | 38 | 14 |
| 400 | 38 | 20 |
| 500 | 37 | 20 |
| 600 | 35 | 22 |
| 700 | 32 | 22 |
| 800 | 35 | 25 |
| 900 | 32 | 28 |
| 1000 | 30 | 30 |
| 4000 | 38 | 38 |

EXAMPLE 7

A nickel-metallized mica powder of 45% metallization was blended with several kinds of thermoplastic resins and thermosetting resins to give volume fractions of 15%, 20% and 25% and each of the blends was shaped into a sheet in the same manner as in Example 6. Table 9 below shows the data of the transmission loss of electromagnetic waves at a frequency of 4 GHz and the volume resistivity of these sheets for each of the resins and for each of the volume fractions of the dispersant.

TABLE 9

| Matrix polymer | Volume fraction of dispersant, % | Transmission loss, dB | Volume resistivity, ohm · cm |
|---|---|---|---|
| Copolymer of ethylene and acrylic acid | 15 | 15.8 | $2.3\times10^2$ |
| | 20 | 16.1 | $6.5\times10^2$ |
| | 25 | 18.1 | $3.2\times10^2$ |
| Copolymer of ethylene and vinyl acetate | 15 | 15.7 | $1.5\times10^2$ |
| | 20 | 20.0 | $1.4\times10$ |
| | 25 | 20.8 | 1.3 |
| Polyethylene | 15 | 26.0 | 1.3 |
| | 20 | 37.9 | $4.4\times10^{-1}$ |
| | 25 | 40.0< | $1.7\times10^{-1}$ |
| Polypropylene | 15 | 21.1 | 7.0 |
| | 20 | 25.5 | 2.4 |
| | 25 | 37.0 | $5.4\times10^{-1}$ |
| Nylon 6 | 15 | 36.1 | $2.6\times10^{-1}$ |

TABLE 9-continued

| Matrix polymer | Volume fraction of dispersant, % | Transmission loss, dB | Volume resistivity, ohm · cm |
|---|---|---|---|
| | 20 | 28.9 | $6.0 \times 10^{-1}$ |
| | 25 | 30.1 | $8.1 \times 10^{-1}$ |
| Polystyrene | 15 | 14.3 | $1.1 \times 10^{3}$ |
| | 20 | 13.2 | $1.7 \times 10^{3}$ |
| | 25 | 15.9 | $1.1 \times 10^{2}$ |
| ABS resin | 15 | 14.6 | $2.0 \times 10^{2}$ |
| | 20 | 13.1 | $3.3 \times 10^{3}$ |
| | 25 | 25.1 | $4.2 \times 10^{3}$ |
| Epoxy resin | 15 | 28.9 | $2.6 \times 10$ |
| | 20 | 40.0< | $3.2 \times 10^{-1}$ |
| | 25 | 40.0< | $2.6 \times 10^{-1}$ |
| Unsaturated polyester resin | 15 | 22.8 | $1.1 \times 10$ |
| | 20 | 40.0< | 1.5 |
| | 25 | 40.0< | $4.5 \times 10^{-1}$ |
| Phenolic resin | 15 | 26.7 | $5.4 \times 10^{-1}$ |
| | 20 | 40.0 | $4.1 \times 10^{-1}$ |
| | 25 | 34.8 | $3.9 \times 10^{-1}$ |

EXAMPLE 8

The nickel-metallized mica flakes prepared in Experiment No. 1 of Preparation 2 were blended with an ABS resin in a proportion to give a volume fraction of the dispersant of 20% and, after kneading in a Brabender plastomill at 250° C. for 6 minutes, the blend was compressed in a hot roller followed by compression molding at 250° C. for 5 minutes into a sheet of 2 mm thickness.

The effectiveness of the thus prepared sheet as a shielding material for electromagnetic waves was examined by the measurements of the volume resistivity and the transmission loss of electromagnetic waves at a frequency of 4 GHz in the same manner as in Examples 1 and 2 to give the results of $4.5 \times 10^{2}$ ohm.cm and 20 dB, respectively.

EXAMPLE 9

An epoxy resin composition was prepared by uniformly blending 100 parts by weight of a room temperature-curable epoxy resin, 105 parts by weight of the nickel-metallized mica flakes obtained in Experiment No. 27 of Preparation 2 and 10 parts by weight of a curing agent for the epoxy resin to give a volume fraction of 20% of the dispersant in the blend and shaped by casting into a plate-like form of 2 mm thickness. After full curing of the epoxy resin, the plate was subjected to the measurements of the volume resistivity and the transmission loss of electromagnetic waves in the same manner as in the preceding example to give the results of $2.0 \times 10^{-1}$ ohm.cm and 40 dB or more at 4 GHz, respectively. These results indicate that the use of a liquid resin before curing is advantageous due to the decreased breaking or crushing of the particles of the metallized inorganic powder to exhibit excellent shielding power of the material impregnated therewith.

EXAMPLE 10

The same phlogopite mica as used in Preparation 2 was used as the base inorganic powder and 800 g of the mica flakes were added to and agitated for 1 hour in an aqueous solution prepared by mixing 1000 part by weight of water, 10 parts by weight of an oligomeric precondensate of melamine, 0.2 part by weight of a curing agent for the melamine precondensate and 150 parts by weight of an aqueous solution of palladium chloride in a concentration of 250 mg/liter as acidified with hydrochloric acid followed by filtration to discard the solution. The thus pretreated mica flakes were heated at 120° C. for 4 hours in air and then subjected to a chemical plating treatment at 90° C. by use of the spent nickel plating solution No. 3 shown in Table 1. The volume of the spent nickel plating solution was controlled so that the nickel content of the nickel-metallized mica flakes was 55% based on the weight of the mica flakes before treatment.

The thus prepared nickel-metallized mica flakes were blended with a polypropylene resin in a volume ratio of 20:80 and the blend was melted and kneaded in a single-screw extruder machine at 250° C. followed by extrusion into pellets. The pellets were then shaped into a plate of 2 mm thickness by injection molding.

The volume resistivity and the transmission loss of electromagnetic waves of the plate were measured in the same manner as in the preceding example to give the results of $4.2 \times 10^{-1}$ ohm.cm and 35 dB at 4 GHz, respectively. The moldability of the resin blend or the pellets was as good as in the molding of conventional polypropylene resins.

What is claimed is:

1. A meterial for shielding of electromagnetic waves which comprises a matrix composed of a polymeric material with particles dispersed therein, said particles comprising inorganic powders having a surface coating of a conductive metal, said particles having been formed by:

1. Treating the powder with an organic compound having at least one functional group capable of capturing ions of a noble metal from a solution containing them,
2. contacting the thus treated powder with a solution containing ions of the noble metal, and thereafter
3. depositing the conductive metal on the surface of the treated powder by chemical plating.

2. The shielding material as claimed in claim 1 wherein the inorganic powder is a mica powder.

3. The shielding material as claimed in claim 1 wherein the metal of the metallizing layer is nickel or copper.

4. The shielding material as claimed in claim 1 wherein the noble metal is palladium.

5. The shielding material as claimed in claim 1 which contains at least 10% by weight of the particles.

6. The shielding material as claimed in claim 1 wherein the functional group in the organic compound is selected from the class consisting of carboxyl group, ester group, amino group, hydroxy group, nitrile group, halogen atoms, isocyanate group, glycidyloxy group and alkoxy and alkenyl groups bonded to an atom of silicon or titanium.

7. The shielding material as claimed in claim 1 wherein the inorganic powder adsorbs from 0.5 to 2.0% by weight of the organic compound based on the inorganic powder in the pretreatment with the organic compound.

8. The shielding material as claimed in claim 1 wherein the inorganic powder adsorbs from $3 \times 10^{-5}$ to $3 \times 10^{-1}$ part by weight of the ions of the noble metal per 100 parts by weight of the inorganic powder in the pretreatment with a solution containing ions of the noble metal.

9. The shielding material as claimed in claim 2 wherein the noble metal is palladium.

10. The shielding material as claimed in claim 3 wherein the noble metal is palladium.

11. The shielding material as claimed in claim 1 wherein the inorganic powder is glass.

12. The shielding material as claimed in claim 11 wherein the metal of the metallizing layer is nickel or copper.

13. The shielding material as claimed in claim 11 wherein the noble metal is palladium.

14. The shielding material as claimed in claim 12 wherein the noble metal is palladium.

15. A method for the preparation of a shielding material of electromagnetic waves which comprises the steps of:

(a) contacting an inorganic powder with a solution of an organic compound having, in a molecule, at least one functional group capable of capturing ions of a noble metal whereby to cause adsorption of the organic compound on the inorganic powder;

(b) contacting the inorganic powder with an aqueous solution containing ions of a noble metal whereby to cause adsorption of the ions on the inorganic powder;

(c) subjecting the inorganic powder to chemical plating with a metal in an aqueous solution containing the ions of the metal;

(d) blending the inorganic powder with a polymeric material to form a uniform dispersion of the inorganic powder in the matrix of the polymeric material; and (e) shaping the uniform blend of the inorganic powder and the polymeric materal into a form of the shielding material.

16. The method as claimed in claim 15 wherein the inorganic powder is a mica powder.

17. The method as claimed in claim 16 wherein the metal of the metallizing layer is nickel or copper.

18. The method as claimed in claims 15 wherein the noble metal is palladium.

19. The method as claimed in claim 16 wherein the noble metal is palladium.

20. The method as claimed in claim 17 wherein the noble metal is palladium.

21. The method as claimed in claim 15 wherein the inorganic powder is glass.

22. The method as claimed in 21 wherein the metal of the metallizing layer is nickel or copper.

23. The method as claimed in claim 22 wherein the noble metal is palladium.

* * * * *